Feb. 19, 1957

D. R. ANDREWS 2,782,043

MAGNETIC TAPE

Filed Aug. 22, 1950

INVENTOR
Dallas R. Andrews
BY Morris A. Rabkin
ATTORNEY

United States Patent Office 2,782,043
Patented Feb. 19, 1957

2,782,043

MAGNETIC TAPE

Dallas R. Andrews, Collingswood, N. J., assignor to Radio Corporation of America, a corporation of Delaware Application August 22, 1950, Serial No. 180,779

5 Claims. (Cl. 274—41.4)

Figure 1:
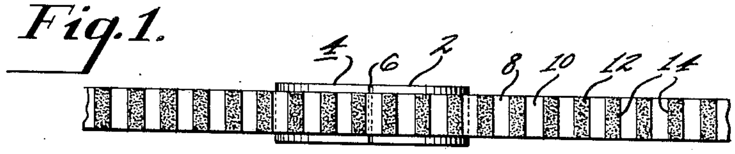

The present invention relates to improvements in magnetic recording tape. This tape may comprise any flexible, non-magnetizable material, such as paper, paper impregnated or coated with a synthetic resin, or a film-forming synthetic resin, itself, and an impregnation or a coating of finely divided magnetizable material on at least one surface. The tape may also be composed entirely of magnetizable material such as steel. This type of tape is adapted to be run through a sound recording machine, which includes a magnetic sound head, in order to have a sound track recorded thereon. The tape may later be run over a sound transducing head where the variations in magnetization recorded on the tape are translated into variations in magnetic flux in the sound head. The variations in magnetic flux are then translated into electrical variations which are fed to a sound reproducing system which may include an amplifier and loudspeaker.

Although the quality of recorded sound which it is possible to obtain with this recording medium is of the highest, the tape has the disadvantage that it may change appreciably in length in a non-uniform manner. For example, low humidity may cause contraction of parts of the tape while high humidity may cause lengthening of the tape. Also, temperature changes, ageing, and stretching of the tape due to reel tension all contribute to cause appreciable percentage changes in length over a period of time.

The above-described changes are usually disregarded in the case of tape used for most purposes such as home recording, office use, or other non-critical applications, since there is usually little change in sound quality apparent to the listener. But, in broadcasting studios using tape-recorded programs, it is necessary to have control over the playing time of a particular recording to the fraction of a second. Much of the broadcasting station's revenue is derived from "station break" advertising shorts having a running time of two minutes or less. If the longer recorded programs vary in playback time by seconds, due to dimension changes in the tape, a station's time schedule may be seriously affected, leaving too little time for the short "commercials."

Because of the necessity of holding playback time of a broadcast tape recording to within a small fraction of a second of recording time, tape has been used having control indicia printed on one of its faces. Heretofore, these control indicia have consisted of bars or rectangular blocks printed on the tape in contrasting color to the background color of the tape. These bars or blocks have been printed with their transverse edges perpendicular to the edges of the tape.

The playback speed of the tape is then controlled by running the tape past a photocell in order to generate a signal having a frequency equal to the frequency of passage of the indicia past a reference point. This frequency is compared with a frequency signal from a standard source and any difference detected is translated into a change in speed of the drive mechanism in order to speed up or slow down the tape velocity as required.

The present invention is more particularly directed to a recording tape of the type above described having indicia of improved form. It has been found that with tape printed with transversely extending bars or rectangles, in which any substantial part of the outline is at right angles to the edges of the tape, regularly recurring amplitude modulation of higher audible frequency notes may sometimes be detected in the sound translating system. This is due to periodic variation of the distance between magnetic sound head and tape caused by the effect which the edge of a printed mark has on the normal smoothness of the surface of a very thin tape. This effect is present even though the indicia are printed on the face of the tape opposite to that which is run against the sound head, for the presence of the edges of the marking medium causes transverse lines or grooves to appear which extend through the tape to the opposite face. These grooves usually become increasingly pronounced with use and the amplitude modulations produced in the sound system may become too objectionable to be tolerated.

The present invention has for one of its objects the provision of a magnetic recording tape having improved velocity control indicia thereon.

Another object of the present invention is to provide an improved magnetic recording tape for broadcast use.

Another object of the invention is to provide an improved marking for velocity control of a magnetic recording tape.

Another object of the invention is to provide an improved magnetic tape sound system having a better signal to noise ratio, especialy in the higher audible frequencies.

Figure 2:
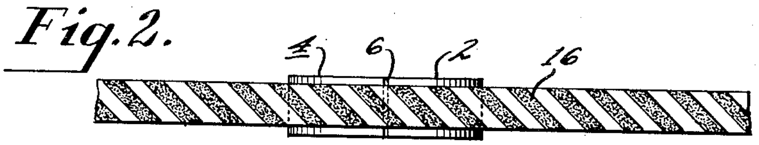
Figure 3:
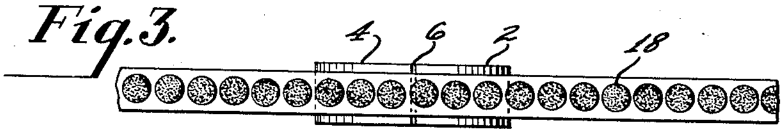
Figure 4:
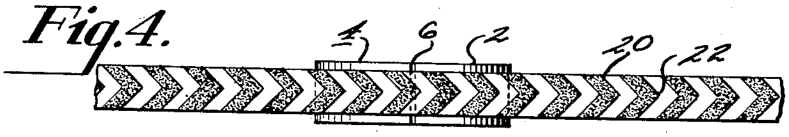
Figure 5:
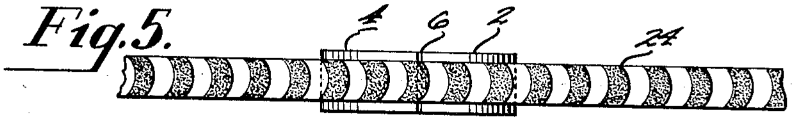

These and other objects will be more apparent and the invention will be more readily understood from the following description, including the drawings, of which, Figure 1 is a plan view of the back side of a conventional broadcast recording magnetic tape and a face of a magnetic sound head in operative relation thereto, Figure 2 is a view similar to Figure 1 but including a tape having indicia of one configuration in accordance with the present invention, Figure 3 is a view similar to that of Figures 1 or 2 but including a broadcast tape having indicia of a second configuration in accordance with the present invention, Figure 4 is a view similar to that of Figures 1 to 3 but including a broadcast tape having indicia of a third configuration in accordance with the present invention, and Figure 5 is a view similar to Figures 1 to 4 and showing indicia of a fourth configuration in accordance with the present invention.

Referring to Figure 1, there is shown a face 2 of a magnetic sound head 4 having a transverse air gap 6 therein for providing a concentrated magnetic field. It will be understood that the sound head is of any conventional type wherein a number of plates of temporarily magnetic material, such as soft iron, are laminated together and provided with windings for electromagnetization. The plates are usually annular in shape and the air gap breaks the continuity of the annuli. The sound head may, in turn, be connected to an amplification system, not shown.

A magnetic recording tape 8, which may be of any conventional type, such as one comprising a paper base impregnated with a synthetic resin and having a coating on at least one face of magnetizable material, is drawn across the air gap of the sound head by any conventional driving means (not shown). The back face 10 of the tape is provided with printed indicia 12 having a color in contrast with the background color of the tape. Where the tape is coated with a reddish color background layer of a magnetizable iron oxide, the color of the indicia may be white or black, for example. In Figure 1, the indicia which are illustrated are of the previously known conventional type. Each mark is in the form of a bar or stripe with its transverse edges 14 at right angles to the edges of the tape and also parallel to the edges of the air gap in the sound head.

These bars are usually printed on the tape with an ink of thin consistency and are thus somewhat raised with respect to the face of the tape. The smaller the difference in thickness between the marked portions and the unmarked portions of the tape, the less is the amplitude variation of the higher audible frequencies caused by the marks. However, even with the thinnest inks, some effect is still observed. This may be due to difference in stiffness of the marked and unmarked portions.

In Figure 2, there is shown a tape having indicia with a preferred configuration in accordance with the present invention. The indicia are printed bars 16 having edges which are at about a 45° angle with respect to the edges of the tape and of the air gap. The improvement in operation brought about by using this type of mark is that the line or groove normally present on the back side of the tape due to the presence of the edge of the printed mark on the opposite side does not abruptly pass over the air gap. The indented striation travels across the air gap smoothly because it is at an acute angle to the line of the gap. This eliminates practically all amplitude modulation which was formerly present when tapes having printed bar indicia were used.

Figures 3, 4, and 5 illustrate other configurations which the control indicia may take and still fall within the spirit of the present invention. In Figure 3, the indicia take the form of large circular dots 18. In Figure 4, the indicia 20 are V-shaped with the apex 22 of the V at the center line of the tape and the legs of the V branching to the edges of the tape. In Figure 5, the indicia 24 take the forms of arcs of a circle.

In all of the above cases, the indicia have an outline configuration in which substantially no part is at right angles to the edges of the tape.

Another way to view the matter is that the indicia have an outline configuration such that substantially no part thereof is parallel to the edges of the air gap. The indicia are at some acute angle or they consist of curved lines of which substantially no portion is parallel to the gap direction. If the air gap is positioned diagonally across the face of the sound head, then the tape indicia might actually be bars having transverse edges normal to the edges of the tape, within the spirit of the present invention. In that case, the tape, itself, might be similar to that formerly used conventionally but the combinaton of air gap, diagonally arranged, and bars with sides normal to tape edge would be considered to fall within the scope of the invention.

It will be apparent that the indicia may asume many other configurations, other than those actually illustrated, within the scope of the present invention. For example, they may be diamonds, ovals, rectangles having corners adjacent the longitudinal axis of the tape, etc. The marking material used is preferably one having a visual reflecting characteristic contrasting with that of the tape background color. However, the marking material, instead, may be more highly reflective in the ultraviolet or infrared if photocells having maximum sensitivity in either of these ranges is used.

I claim as my invention:

1. A magnetic recording and reproducing tape having on a side thereof spaced indicia provided with energy reflecting characteristics different from those of the background upon which they are superimposed, the indicia having an outline configuration such that substantially no part thereof is at right angles to the edges of said tape.

2. A tape according to claim 1 in which said indicia have outlines comprising straight lines.

3. A tape according to claim 2 in which said indicia are bars extending diagonally across the tape.

4. A tape according to claim 1 in which said indicia have outlines comprising curved lines.

5. A tape according to claim 4 in which said indicia are circular in outline.

References Cited in the file of this patent

UNITED STATES PATENTS

| | | |
|---|---|---|
| 1,836,691 | Tuttle | Dec. 15, 1931 |
| 1,976,355 | Mees et al. | Oct. 9, 1934 |
| 2,496,047 | Goddard | Jan. 31, 1950 |

FOREIGN PATENTS

| | | |
|---|---|---|
| 770,489 | France | Sept. 14, 1934 |